Aug. 22, 1950 W. H. COLBERT ET AL 2,519,545
COLORED MIRROR
Filed Feb. 11, 1946 8 Sheets-Sheet 1

INVENTORS
WILLIAM H. COLBERT
BY WILLARD L. MORGAN
ATTORNEYS

Aug. 22, 1950　　W. H. COLBERT ET AL　　2,519,545
COLORED MIRROR
Filed Feb. 11, 1946　　8 Sheets-Sheet 2
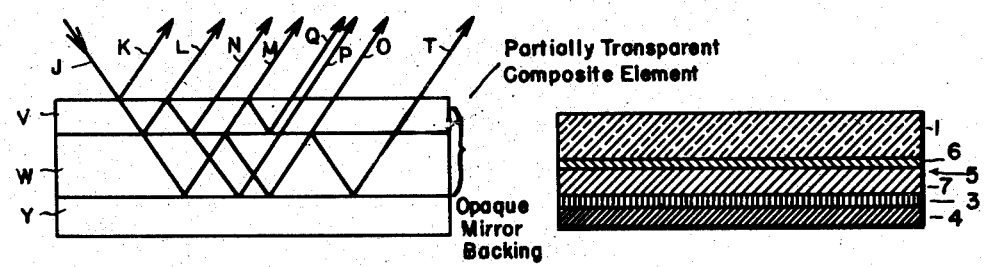
Fig. 8　　Fig. 9
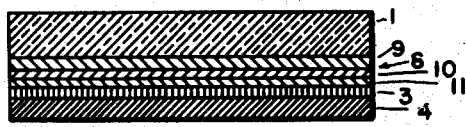 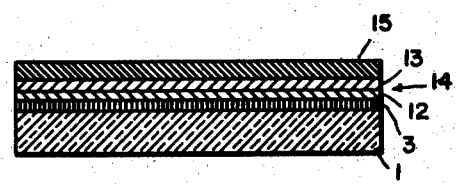
Fig. 9a　　Fig. 10
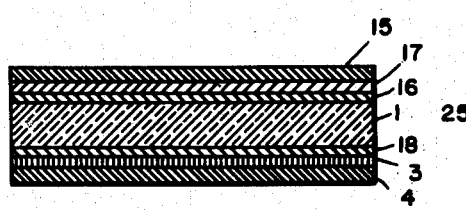 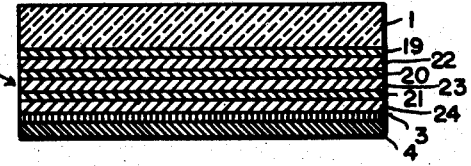
Fig. 10a　　Fig. 11
INVENTORS
WILLIAM H. COLBERT
BY WILLARD L. MORGAN
ATTORNEYS

INVENTORS
WILLIAM H. COLBERT
BY WILLARD L. MORGAN
ATTORNEYS

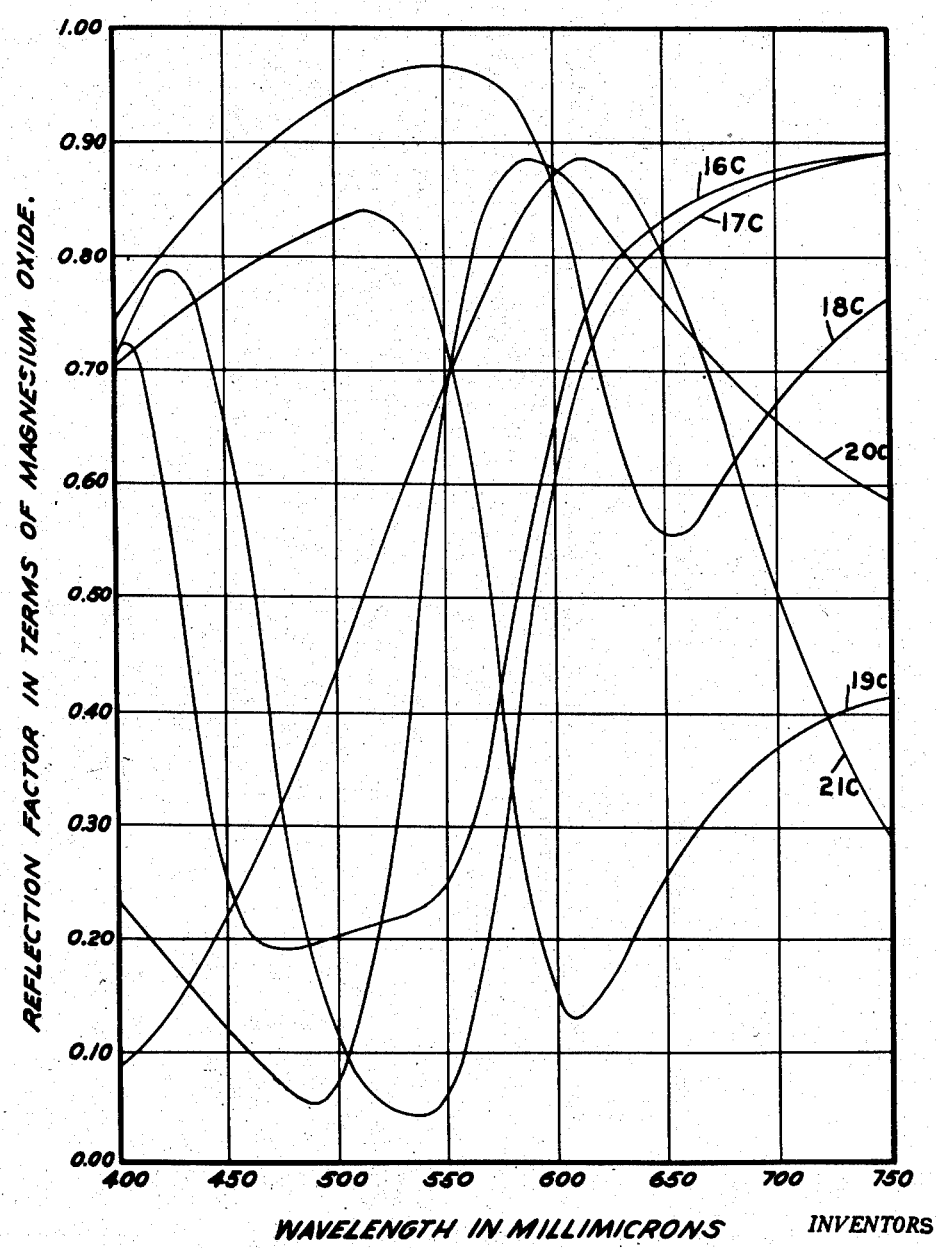

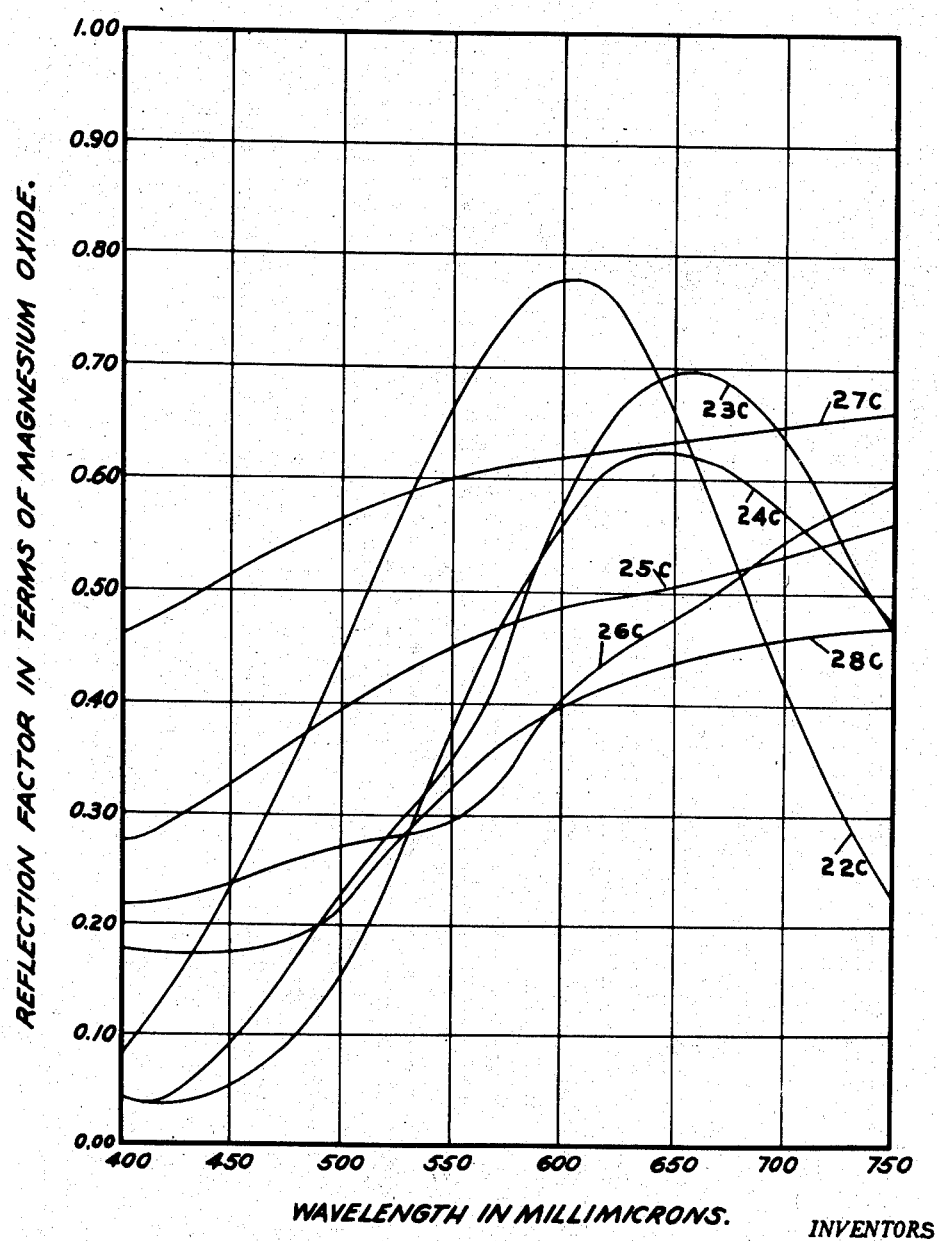

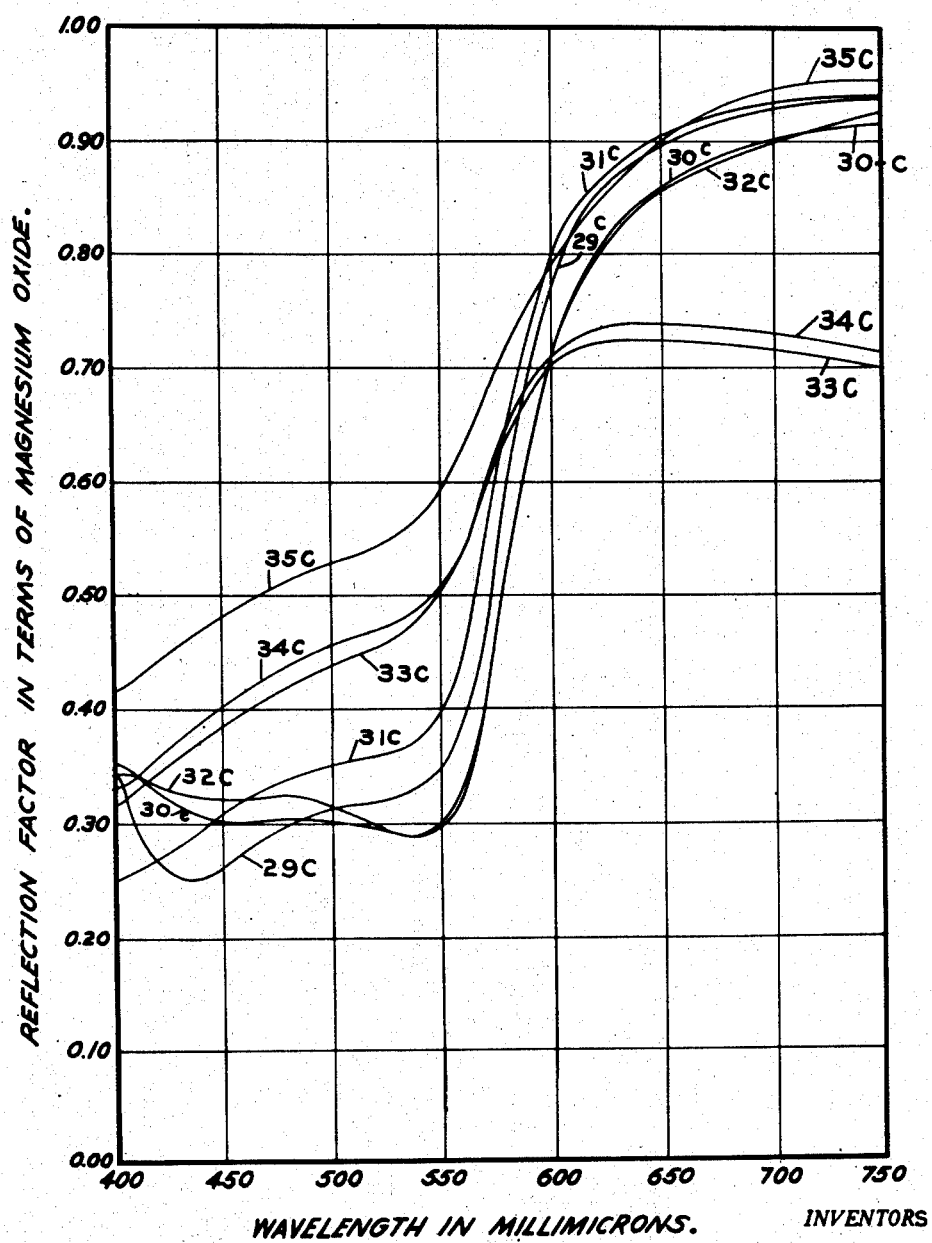

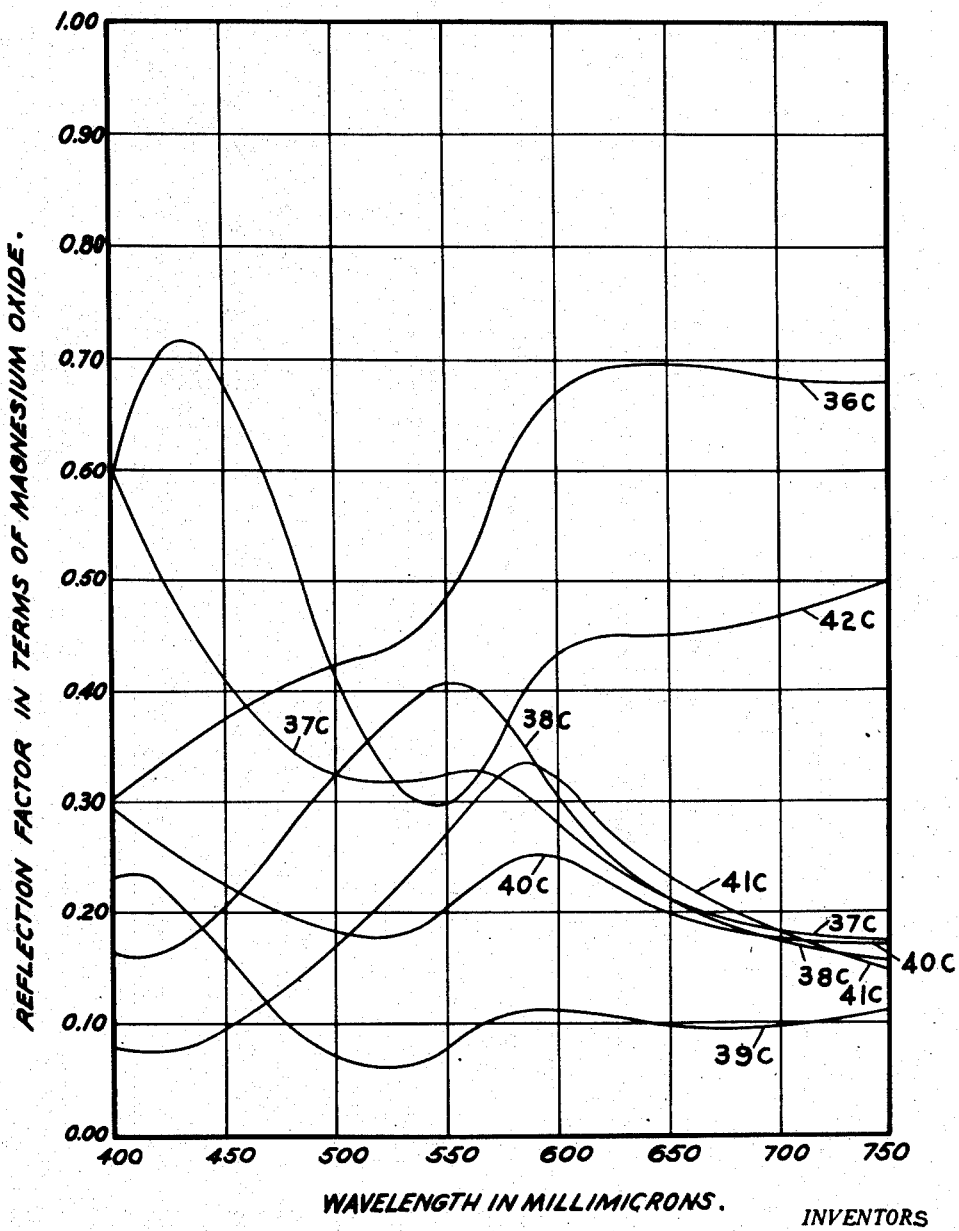

Patented Aug. 22, 1950

2,519,545

UNITED STATES PATENT OFFICE 2,519,545

COLORED MIRROR

William H. Colbert, Brackenridge, and Willard L. Morgan, Haverford, Pa., assignors to Libbey-Owens-Ford Glass Company, Toledo, Ohio, a corporation of Ohio Application February 11, 1946, Serial No. 646,875

16 Claims. (Cl. 88—105)

Our invention relates to colored mirrors. It has to do more particularly with the production of mirrors having desired color and reflectivity characteristics. More specifically, it relates to the production of mirrors of desired color wherein the color is obtained primarily by producing interference of light rays which strike the mirrors.

This application is a continuation-in-part of our copending application Serial No. 476,076, filed February 16, 1943, now Patent No. 2,394,533.

Despite the wide possible use of colored mirrors in furniture, store decoration, theater decoration and other decoration, sales displays, etc., and as automotive mirrors, and the possible use of colored reflective surfaces to add to the attractiveness of shaped glassware, there has been little use to date of such mirrors and surfaces due to the expense of producing them and the few shades available.

The accompanying drawings will aid in the understanding of our invention.

In the drawings:

Figure 8 is a diagram illustrating how various light rays will be reflected from a combination of multiple reflecting layers according to our invention and showing some of the paths followed by the light rays;

Figure 9 is a transverse vertical sectional view of a second surface mirror made according to our invention employing multiple reflecting layers according to this invention;

Figure 9a is a similar view of a second surface mirror made in accord with the invention employing numerous partially transparent reflecting layers of different materials and backed by an opaque reflecting layer;

Figure 10 is a transverse sectional view illustrating a first surface mirror made according to our invention which employs multiple reflecting layers;

Figure 10a is a similar view of another mirror construction in accordance with the invention in which some of the multiple reflecting layers are found upon each side of the support;

Figure 11 is a view similar to Figure 9 in which numerous partially transparent reflecting layers of two different materials are employed in the mirror in spaced relationship in accordance with the invention;

Figure 16 through Figure 19, inclusive, are spectral reflection curves for mirrors made under the invention as described more fully below.

Figure 1:
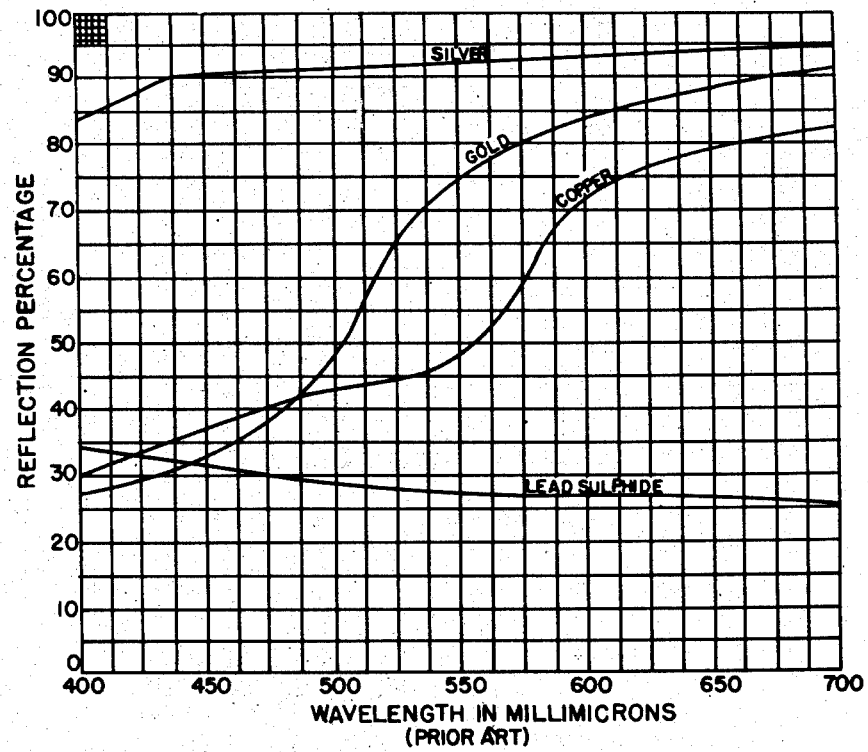
Figure 1 is a diagram showing spectral reflection curves for silver, gold, copper and lead sulfide mirrors of the prior art.

Silver mirrors of 88–92% reflectivity value made with clear ordinary plate glass have no color, since all the various light rays are reflected approximately equally, as seen from the spectral reflection curves in Figure 1. Some colored mirrors have been used commercially which were made by silvering colored glass, the color thereby secured being the color of the glass. The color of the glass arises from the fact that the glass absorbs some types of light rays more than others and the light rays which are transmitted, with the least absorption, thus impart the color to the glass. Thus, "Solex" green glass, made by Pittsburgh Plate Glass Company, is green because it absorbs much of the red and blue light out of the white daylight as such light passes through the glass. A green mirror, made with silver on the "Solex" green glass, showed a reflectivity value, for visible light, of 61% and similar mirrors, made with a glue glass and a flesh colored glass, showed reflectivity values of 35% and 68.3%. These are all lower than the reflectivity value of silver on the colorless glass, by reason of the loss of the colored light, which the colored glasses absorb. The use of such colored glasses is expensive and, moreover, satisfactory quality for forming mirrors is not readily available.

Using plain plate glass, some colored mirrors have been made in which the color arises from the selective reflection of the various light waves of different colors to different degrees. Thus, gold mirrors show a spectral reflection curve, as shown in Figure 1. The gold mirror appears yellow because little green or blue is reflected while much larger amounts of yellow and red are reflected, the overall reflectivity of total visible light for gold mirrors being about 75%. The copper mirror, which reflects about 55% of all light, is orange-red, being different from the gold mirror in that most of the light reflected is red. Copper mirrors have not been commercialized due to the unreliable methods for their production. Gold mirrors are expensive and, therefore, have not gone into wide use.

The use of fuchsin or methyl violet dyestuffs in opaque layers for mirror surfaces has been suggested. Such mirror surfaces reflect 11.6% of the total visible light. Experience with such mirrors indicates that where such dyes are used as the reflective layer they must be present in fairly thick opaque layers and the reflectivity percentage is always low and the mirrors quite dark. The colors secured are invariably the complementary color to the normal color of the dyestuff when seen in solutions by transmission. Thus, methyl-violet gives a green mirror since the film transmits red and violet light and reflects, selectively, the green light which it does not transmit. Thus, the color in these mirrors arises solely by selective reflection, just as is the case with gold, which when viewed by transmission is green, the gold being relatively transparent to green light but opaque to the red and yellow light which it reflects selectively. Mirrors of this type are not stable, the films rapidly breaking up and spotting and in service the color soon changes to muddy non-reflective grays. As a result they have had no commercial use in spite of the demand for colored mirrors.

Mirrors made with platinum, iridium, or aluminum are silvery in appearance and without color, while those made with chromium, silicon, or lead sulfide are dark and without color tone. Likewise, glass coated with asphalt or black paint, with reflectivity values of 5%, and mirrors of black opaque glass, with 5% reflectivity, are not very useful because of their extremely low reflectivity values and the very dark images which thus appear in such reflective surfaces.

Thus, despite the wide possible use of colored mirrors and colored mirror surfaces, there has been little use to date because of the expense of producing such mirrors and surfaces and the few colors and shades available, as shown above.

One of the objects of our invention is to provide colored mirrors or other mirrored surfaces of a wide range of color characteristics and of a wide range of reflectivity percentage characteristics which can be controlled as desired.

Another object of our invention is to provide mirrors or other mirrored surfaces of various colors and reflectivity values in which the colors are mainly secured by light interference effects and are permanent and inexpensive.

A further object of our invention is to provide mirrors or other mirrored surfaces of various colors and reflectivity values in which the colors are secured by light interference effects produced by two or more extremely thin partially transparent layers of different substances acting cooperatively to produce interference color effects, and in which the color and reflectivity of the mirror or article are further modified by an opaque mirror reflective backing layer.

Various other objects will be apparent from the following description.

The colors which appear in thin-walled soap bubbles and in very thin oil films do not arise from any inherent color in the soap film or in the oil. Also, in these cases, it is well recognized that the colors do not come from any selective color light absorption effects, as the soapy water and oil do not show such colors directly. As the soapy water and oil in bulk are also clear and transparent and non-reflective, it is apparent that the colors do not arise from any selective reflection of light. The colors are known to occur from interference of the light rays, which results in a neutralization or loss of certain colored lights and the residual light which then appears is, obviously, colored. The particular color of light rays removed by interference is dependent upon the thickness of the film and its refractive index, as will be shown later. It is well known that interference colors can only appear in extremely thin films which are of a thickness comparable to one-fourth the wave length of light and which are at least partially transparent.

We have found that by depositing reflective coatings of various materials in extremely thin films which are still partially or considerably transparent that the two or more extremely thin semi-transparent laminae of different substances will act cooperatively to produce light interference colors and upon backing these with a substantially opaque reflective coating of another material, we can secure a wide range of colored mirrors of various reflective characteristics for the various rays of light and in terms of total light reflection. We obtain these effects by simple and inexpensive means and colored substances or colored glass are not necessary. The colors are permanent and do not fade or alter, as they are dependent primarily upon physical light interference effects. The substantially opaque reflective backing need not be colored although it may be, but it is of a different refractive index from any immediately adjacent contacting layer of semi-transparent reflective material and by its substantial opaqueness it prevents viewing of the background through the mirror.

We have found that by the controlled deposition of very thin uniform semi-transparent films of many materials we can secure reflecting bodies of a wide range of color and reflectivity characteristics. The material used as the reflecting substance in any of the layers in the products need not have any inherent color. Such mirror bodies have been described more particularly in our copending applications Serial Nos. 473,473 and 473,474, filed January 25, 1943, and in Serial No. 476,076, filed February 16, 1943. By backing the composite of the semi-transparent mirror layers with a substantially opaque or semi-opaque mirror layer of a material of good reflectivity, which may or may not be colored, we produce by the cooperative action of the various reflective layers entirely new and different mirrors with characteristic color and reflectivity properties. Other combinations of reflective layers may be employed according to our invention. For example, we may employ semi-transparent interference layers, backed up by a transparent layer, which may have color, and which is backed up by a substantially opaque mirror reflective layer. Any desired number and arrangement of layers upon a support such as glass may be provided as long as at least two semi-transparent interference color producing layers are present in the structure in immediate continuous contact as a composite and the mirror structure is backed up by at least one reflective layer which is opaque or sufficiently opaque to prevent viewing of the background.

Figure 2:
Figure 2 is a diagram illustrating light waves of a single ray of a definite color.
Figure 3:
Figure 3 is a diagram illustrating light waves of two rays of the same type vibrating in the same wave phase.
Figure 4:
Figure 4 is a view similar to Figure 3 but showing the rays vibrating in opposite phase.

The development of colors by light interference has been explained upon the basis that light radiations are of a wave form, such as shown in Figure 2, which represents a single ray of a definite color. Blue light differs from red in that the length of the waves is shorter, in the case of the blue, and longer, in the case of the red. The other visible colored rays of light are of intermediate wave lengths. White light is composed of a mixture of all of these visible rays. If two rays $a$ and $a-1$ of the same monochromatic type or wave length happen to be vibrating in the same wave phase, as in Figure 3, they amplify each other and the intensity is increased. However, if they happen to be vibrating in opposite phase, as shown at $a-2$ and $a-3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light. The remaining light will then no longer be white but of a color resulting from the remaining green, yellow, orange and red rays and will appear a reddish-yellow color.

Figure 5:
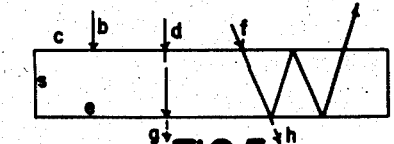
Figure 5 is a diagram illustrating how various light rays will be reflected from a reflecting layer.

If we consider two light rays impinging upon a reflecting substance $s$, as in Figure 5, and assume that ray $b$ is reflected at the top surface $c$ while ray $d$ passes on through the semi-transparent layer $s$ to the bottom surface $e$ before it is reflected, it is apparent that the second ray has had a longer path to travel before it again emerges from the top surface $c$ of the layer $s$. Thus, the ray $d$ lags considerably behind the ray $b$ and in consequence, the crests and troughs of the waves of the two rays $d$ and $b$ can be arranged so that the difference in phase is such that interference of the waves of two of such rays, entering or being reflected at any point on the surface of $s$, will occur. The time difference between the waves of the two rays will be dependent upon the thickness of the layer $s$ and the speed with which the given light ray travels in the material comprising the layer $s$.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move slower and all the light rays do not necessarily move at the same speeds. The proportionality constant N between the velocity of light in a given substance and the velocity of light in air is called the refractive index for that substance.

$$N = \frac{\text{Velocity in air}}{\text{Velocity in substance}} = \frac{\text{wave length in air}}{\text{wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray $d$ to come out of the top surface and be 180 degrees out of phase and to thus interfere with the ray $b$, it must be slowed down in time and distance equal to the distance of one half of a wave length of the ray in air, i. e.

$$\frac{\lambda_a}{2}$$

As the ray is traveling only 1/N as fast in the substance $s$, comprising the layer, and must traverse the thickness of the layer twice, the thickness of $s$ required to cause an equivalent slowing effect is then $$\frac{\lambda_a}{4N_s}$$

In a similar way, thicknesses equal to 1, 3, 5 or any uneven integral multiples of this quantity should also show interference effects. If the ray $d$ is reflected within the layer $s$ not once but two times, it is apparent that the film needed for interference need be only $$\frac{\lambda_a}{8N_s}$$

thick. Thus, as shown in Figure 5, wherein the ray $f$ is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_sR}$$

Furthermore, it is apparent that similar thicknesses equal to 1, 3, 5 or any uneven integral multiples of such quantities will show interference effects with rays which are multiply reflected within the layers. Thus, the suitable film thicknesses for our films or composites of contacting partially transparent films are of the order of one-fourth of a wave length of any visible light ray or some small multiple or submultiple of this, divided by the refractive index of the material used in the semi-transparent film or films.

Since the various colored rays of light have different wave lengths and these range from 4000 to 7500 Angstrom units or 0.4 to 0.75 micron or thousandth millimeters in the visible spectrum, it is obvious that a semi-transparent film which is thick enough to cause interference with the short blue rays will not cause interference with the long red rays, etc. Thus, each thickness of semi-transparent film will take out certain defined portions of the spectrum and a film will take on a series of different colors as the thickness is varied. As will be shown in the examples which follow, the colored mirrors of our invention produced by light interference, show varied colors, depending upon the thickness of the semi-transparent mirror film or films employed. In the spectral reflection curves for these mirrors, the portion of the curve and minima of reflectivity caused by interference, shifts from the blue range of wave length toward the red, as the semi-transparent film or films are made thicker.

Figure 15:
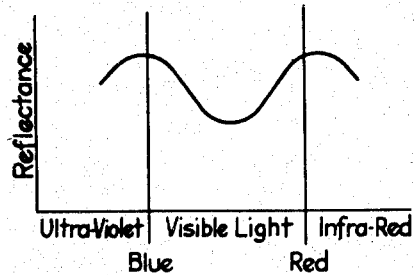
Figure 15 is a diagrammatic spectral reflection curve such as is found with our mirrors employing a single partially transparent reflecting film approximating one quarter wave length in thickness.
Figure 15A:
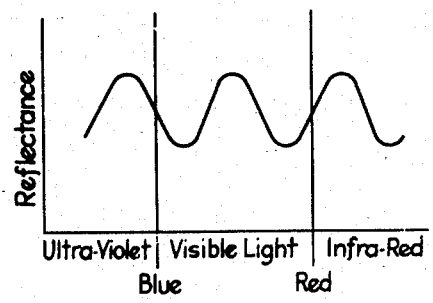
Figure 15a is a similar diagram as found with mirrors employing a partially transparent reflecting film or cooperating films in which the optical thickness is several quarter wave lengths.

In Figure 15 there is shown a generalized diagram of the spectral reflection curve type found with our mirrors when a single semi-transparent mirror film approximating a one-quarter wave length of light thickness $$\frac{\lambda_a}{4N}$$

or a group of two or more such semi-transparent mirror films are employed cooperatively to approximate a one-quarter wave length of light in optical thickness; the mirrors in each case being backed by an opaque mirror reflecting layer. The location of the minima shifts with increasing thickness as indicated above, the minima being clearly the wave length of light removed by the light interference effect and the wave length to be considered in establishing the optical thickness of the semi-transparent mirror or reflective film or similar multiple cooperating films. As the total optical thickness of the single semi-transparent film or semi-transparent cooperating films becomes a multiple of a quarter wave in thickness such as 3 or 5 the distance between adjacent minima in the spectra becomes smaller as shown by the generalized diagrammatic spectral reflection curve for mirrors of such type made under this invention as shown in Figure 15a.

The semi-transparent film or films must be of very uniform thickness, if the color is to be the same throughout the mirror. This has called for special means of producing such semi-transparent reflective layers in view of the extreme uniformity and extreme thinness of the semi-transparent layers desired. On the other hand, it is within the scope of our methods to produce colored mirrors of mottled or variegated colors where the semi-transparent film thicknesses of one or several of such films are deliberately varied to cause such effects.

Interference effects in perfectly transparent materials or in cooperatively acting multiple layers of these in immediate contact do not occur at thicknesses beyond about the ninth multiple of the quarter wave length factor already described. In semi-transparent materials, the increasing absorption of light by the increasing thickness of film, which is exponential with respect to the thickness, may soon leave so little light reflected from the bottom surface e that no interference effect can be found in the reflected light which is then coming entirely from the top surface c. Obviously if a mirror film is opaque all of the light is absorbed before ever striking the bottom surface e and therefore no light is thrown back to cause interference effects, particularly as the film obviously must be traversed twice if interference is to be obtained. Since most commercial mirrors have been made with mirror layers thick enough to be opaque, they have not shown any interference colors and their entire reflection occurs at the top surface of the mirror layer. The occurrence of interference by multiple reflection within the layer or layers, as shown in Figure 5 with ray f, and in Figure 8 with rays n, p, q, o, and t originating from light ray j, is very quickly limited by the transmission values for the film or films and, in practice, we have not found evidence for more than two to four such internal reflections although more may occur in the more highly transparent films and in the thinnest of the films.

It is thus apparent that the amount of light which comes back through our semi-transparent mirror film or films and is then available at the upper surface or intermediate surfaces to cause light interference effects is a function of the transparency of the material or materials used in the semi-transparent layer or layers, the transparency being considered with respect to the particular wave length of light at which interference is developed as determined by the film thickness or cooperating film thicknesses. The transparency of the film or films with respect to ordinary visible light generally is thus important and we use films which are partially or semi-transparent or which show a visible light transmission of 10 to 90% in the thickness employed. Preferably at least one of the partially transparent reflective films should have a transparency in this range and the other or others in a laminae of cooperating layers of different substances may have even higher transparency. Where all the partially transparent thin films are of over 90% transparency we can still prepare our colored mirrors but the mirrors are of low color saturation.

The amount of light reflected from the surface of a single semi-transparent layer is a function of the refractive index, being greater the larger the refractive index for the substance comprising this film, and we find it also becomes greater as the thickness of the semi-transparent film increases until it is opaque. While it may thus be an advantage to use a material or materials for the semi-transparent mirror layer or layers which have a high refractive index to secure greater brilliancy of reflection and to permit the use of thinner, more transparent films, thus giving greater efficiency of light removal by interference and thus giving purer and deeper color tones, we do not restrict our selves to the use of any particular range of refractive index materials but may use a wide range of substances. It is apparent that a material of about 50% reflectivity value, when viewed in a normally opaque thick film, which can be laid down in very thin films which are of high transparency, will show the brightest and deepest interference colors as mirrors. We may, however, use materials which in their ordinary opaque film or in bulk show much higher or lower reflectivity values than this and are not restricted to any range in this constant, although values lying between 80 and 20% are preferred. Thus, thin calcium fluoride coatings will reflect something less than 10% of the light at the top surface and are very transparent (approximately 96–97%) and the reflected light coming from the back surface causes interference colors to develop but the depth of color resulting is low due to the white light mixed with the colored light being of a high intensity. It is necessary that the film or films used for our mirrors have the characteristic of giving some specular or mirror type reflection of light, since diffuse type reflection is not satisfactory. As shown by the calcium fluoride this reflected specular type reflection of light can be quite small from a given layer.

The statements of the preceding paragraph have discussed the usual reflectivity of a single film of material in contact with air and the relationship of such reflectivity to the refractive index of the material comprising the film. The reflectivity (R) at perpendicular incidence of light of a layer of material in contact with another continuous medium at the interface between the two media is known by optical principles to be related to the refractive indices ($N_1, N_2$) of the two media as follows:

$$R = \left(\frac{N_1 - N_2}{N_1 + N_2}\right)^2$$

As the rerfactive index of air is 1 the relationship simplifies for a single film of continuous nature as discussed above. With the partially transparent films of solids of continuous nature employed in contact with each other in forming our mirrors it becomes apparent that the reflectivity conditions applying at the various interfaces between such and at any interface between these and or the support for the mirror and with the opaque specular or mirror reflecting backing are determined to a large degree by the refractive indices of the two adjacent contacting materials or films. While it is often of some advantage that these be of considerably different refractive index, materials of closely similar indices may also be employed.

If adjacent layers of different materials are of the same refractive index then no reflection occurs at the interface between such layers and the two layers will cooperatively act as a single layer of such refractive index and a ray of light will act in such two layers as shown for the single layer $s$ in Figure 5. The limiting light absorption of the composite is then a joint result of the individual absorptions of the layers. While some or all of our adjacent partially transparent reflective films of continuous nature and of different substances may be of similar refractive index and thus act cooperatively in such manner, we generally employ such adjacent contacting and cooperating films of different materials having different refractive index. It is necessary however that a partially transparent reflective film contacting a surface of the support, such as a glass plate, be of different refractive index from that of the support if such film is not to become optically a part of the support. On the other hand where the film contacting the support and the support are of the same index of refraction and where there is also present one or more other partially transparent layers of different refractive index and of the desired range of thickness in the mirror structure and an opaque mirror reflecting layer backing is employed. colored mirrors will be produced according to this invention, such other films and backing determining the color and generally the reflectivity of the mirrors.

It is essential however for the purposes of this invention in order to bring about the desirable action of the opaque mirror reflecting backing layer in modifying the color and reflectance secured in our mirror structures that the index of refraction of such backing layer be different from the index of refraction of the contacting partially transparent reflecting layer or the index of refraction of the contacting support material. Thus, the backing opaque reflective layer must be of a different refractive index from the substance it contacts with in the various types of mirror structures under the invention. Consideration will show that where the normally reflective opaque layer is used in a structure in which it has the same index of refraction as the layer or support in direct contact with it that such normally reflective layer would show no specular reflection value at such interface. The light would then penetrate into such opaque layer and be absorbed instead of being reflected and the layer would act for all purposes as a non-specular reflective opaque absorbing backing.

Colored mirror structures utilizing a layer or multiple layers of thin partially transparent reflective films cooperatively and with an opaque non-specular reflecting backing are the subject of copending applications Serial No. 475,473, filed January 25, 1943, (now patent No. 2,430,452) and the continuation-in-part from the same, Serial No. 646,876, filed February 11, 1946.

As will be apparent from the drawings representing our mirror structures and from the above discussion our thin partially transparent reflective films are layers of materials in a continuous solid form such as can optically act as a layer or layers and cause interference and they are in no case coatings made up of small separate isolated discrete areas or spots covering only a part of the contacting surface such as might cause color phenomena by diffraction of light.

Figure 6:
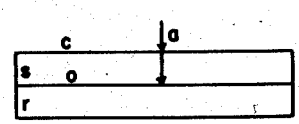
Figure 6 is a diagram similar to Figure 5 but illustrating a combination of reflecting layers according to our invention.

We find that when our thin semi-transparent reflective films, in which interference colors are developed, are backed up with a relatively thick semi-opaque or substantially opaque film of a mirror material that light, which is normally lost out of the back of our thin semi-transparent mirror film or cooperating contacting laminae of such, is reflected and returned out through the face of the mirror combination with generally higher reflectivity values. Thus, in Figure 5 the dotted arrows $g$ and $h$ indicate some light which is normally transmitted through the semi-transparent mirror film $s$ which is not reflected at surface $e$, and which is, consequently, lost out the back of the mirror. By backing up the semi-transparent mirror film $s$ (or similarly a multiple layer of such contacting films) with an opaque mirror body $r$, as illustrated in Figure 6, we obtain a reflection of a considerable portion of the light represented in rays $g$ and $h$ in Figure 5. This results usually in increased general light reflectively of the mirror or mirrors as a whole which includes such a combination of layers. Furthermore, for example, if the semi-transparent mirror film or cooperatively acting laminae or layers of such multiple films is of a thickness that the reflected blue rays, for example, are out of phase and are, therefore, destroyed by interference, this increased reflection for blue light at surface $e$ results in more light for interference at the top surface $c$ and greater destruction of blue light. Thus, the red color of the mirror is also intensified. For this to happen it is not only necessary that the semi-transparent film or films be fairly transparent to blue light but that the relatively opaque reflecting body $r$ reflect blue light. If the semi-transparent layer or layers are also good transmitters of red rays and the substantially opaque layer reflects red rays, an intensification of reflected red light is secured by the use of the substantially opaque backing mirror layer. Thus, still greater intensification of the red color of the mirror or mirrors is secured. In general, brighter deeper color tone mirrors of higher reflectivity are thus secured by the use of a substantially opaque mirror film in back of our semi-transparent mirror layers, and a wide variety of colors and reflectivities can be secured in our mirrors.

Where the semi-transparent reflective film or group of such films is selectively more transparent to some colors or specific wave lengths, such as red in the case of lead sulfide alone or with silica, and green in the case of gold alone or with magnesium fluoride we find that by backing up our very thin reflective films with a thick substantially opaque film of a mirror body, such as silver particularly which is a good reflector for all colors of light as shown in Figure 1, these rays are then returned out through the face or front of the mirror with consequent higher reflection for these particular rays. Thus, while the mirrors made with extremely thin lead sulfide semi-transparent coatings or such cooperating films of lead sulfide and silica together, which have been backed up by forming a substantially opaque silver mirror layer over the lead sulfide, show the spectral range of colors, depending upon the thickness of the lead sulfide or of the cooperating films used and these mirrors reflect more light and are brighter, in consequence, and are also of definitely redder tones, excepting where interference occurs in the red, than the similar films having only the semi-transparent lead sulfide coating or cooperating lead sulfide and silica coatings. With thin semi-transparent gold mirrors backed by substantially opaque silver, the mirrors are also mostly brighter and of higher reflectivity in the green than the mirror films having the gold coating only. The same change occurs with the use of gold coatings backed by magnesium fluoride when such combined films are backed, for example, with an opaque silver or aluminum mirror reflective coating.

We may use many other substantially opaque mirror films, other than silver, behind our semi-transparent thin film mirror layers or composite layers of semi-transparent thin films for the purpose of modifying the general hues and reflectivities of those layers and of thereby securing our new colored mirrors. In general, any material giving a specular mirror reflectivity, rather than the diffuse type reflectivity, and of a total reflectivity of over 15% has been found to be useful as a substantially opaque mirror backing layer for use with the thin semi-transparent reflective films and composites of such films, in forming our compound mirrors described. The high general reflectivity for all types of visible light make silver and aluminum with 90% reflectivities, magnesium with 73% reflectivity, platinum with 63% reflectivity, iron with 55% reflectivity, nickel with 60% reflectivity, rhodium with 75% reflectivity, as well as cobalt, chromium, iridium, indium, antimony, molybdenum, palladium, cadmium and other silvery appearing metals, quite useful as backing reflectors. We may also use opaque lead sulfide films of 30% reflectivity, as shown in Figure 1, or molybdenum or antimony sulfides of about 40% reflectivity, or other metallic sulfides or minerals having a metallic reflection.

Mirror materials of selective color reflectivity characteristics are of value as backing reflectors in combination with the semi-transparent interference color reflective films in that a further means of modifying the color characteristics of the compound mirror, thus formed, is secured. Thus, we may use a substantially opaque relatively thick layer of gold or of pyrite on the back of a thin semi-transparent layer of lead sulfide or upon any of our composite partially transparent contacting laminae of a plurality of layers which show interference colors. In Figure 1 while gold shows about 77% reflectivity, the higher selective reflection of red and orange light by ordinary opaque gold mirrors is quite apparent. Copper and its oxide cuprite both reflect strongly in the reds. Silicon and selenium reflect more strongly in the blue than in the remaining visible light, the reflectivity ranging from 40% in the blue, in each case, down to 28 and 25% in the red, in the respective cases.

It is necessary that the material comprising the backing mirror be of a different material and as already discussed of a different index of refraction from the substance comprising the very thin semi-transparent layer in contact with such so that a definite light reflective surface be formed on the front of the backing layer. In giving specular mirror reflectivity the materials chosen for our backing layers are such that images clearly visible to the eye are apparent therein.

As a material suitable for the forming of the very thin semi-transparent reflective layers, we have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown in Figure 1, is quite transparent in very thin films to green light. So also is copper which reflects, as shown in Figure 1, when in opaque films and which has a refractive index of 1.10 at 5000 Angstroms and 0.44 at 6500. Both of these substances, either alone or in combination with partially transparent layers of other substances, may be used in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and a minimum of 45% in the blue, may be used as a single partially transparent film or as a film in a composite element comprising a plurality of thin partially transparent films, as may also silicon, normally of about 38% reflectivity, and having a refractive index of 3.8 to 4.2. Antimony, having a refractive index of 1.62 and a reflectivity of about 55%, can likewise be used. Fluorite or calcium fluoride, having a refractive index of 1.43, and other fluorides of about the same refractive index, such as magnesium fluoride having an index of 1.38, may be used as a reflective layer, although these very transparent substances are of low reflectivity values as previously mentioned. Thus, for fluorite alone the estimated reflectivity value would be 3 to 4% uniformly throughout the visible range and very thin films of this material give low reflectivity values and give light interference tints where used as separate single films.

It is also possible to use films, which are in the desired thin range and which cause interference coloration of mirror type reflectors in which the film is a jointly deposited mixture, chemical combination, or alloy of film-forming materials. For example, a jointly deposited mixture of gold and lead sulfide is suitable.

While no color need be present in the material or materials used as the semi-transparent reflecting layer or layers, such as in the case of lead sulfide, the use of such materials as gold, showing selective specular reflection, as the semi-transparent layer, brings an additional source of possible variation of both the hues and spectral reflectivity characteristics in our final compound mirrors produced by using these layers backed by a substantially opaque reflective layer. The choice of a material for the semi-transparent reflective film which has color characteristics in its normal reflection, such as gold, imposes its normal reflection spectral limits, to some degree, on the general nature of the light reflected by the film and from which various spectral components are subtracted by the light interference effects, depending on the thickness of the film used and its refractive index. Thus, in general, our compound mirrors made with a very thin semi-transparent layer of gold film or of such gold and magnesium fluoride films are of higher total reflective values and thus brighter, and also of particularly higher reflectivity in the yellow and red, than are similar compound mirrors having thin semi-transparent layers of lead sulfide, or of lead sulfide and silica, the colors and reflectivities, in each case being derived, to a main degree, by the interference effects arising from these layers in combination with the normal reflective characteristics for these materials and, in turn, further modified by the nature of the substantially opaque mirror backing used. Cuprite or cuprous oxide, which is a bright red and gives a reflectivity in bulk of about 20% and has a refractive index of 2.7, as well as ordinary cupric oxide have been found to be quite satisfactory as materials for use in the semi-transparent layers in making our compound colored mirrors.

While silver or aluminum alone as a single layer do not lend themselves to giving colored reflective mirrors, due to failure of light interference to occur in these single films, we have found, when employed in mirrors in very thin partially or largely transparent layers with other thin films of different substances, that excellent interference colored mirrors are obtained when a suitable opaque backing is applied to such structures. Other silvery metals, such as those already described as suitable for the backing opaque reflective layers may also be used in forming the thin partially transparent layers which either singly or in combination with other metals or materials in multiple composite layers of such nature are employed in forming our mirror structures. Thus, for example, platinum, iron, or cobalt or even the darker metals, such as chromium, are suitable. Most oxides, sulfides, selenides, tellurides, and halides of inorganic nature may be employed in forming the thin partially transparent reflective layers in our mirrors and by way of example, but not by limitation, we may add to such substances already enumerated, silica, lead oxide, magnesium oxide, silver oxide, aluminum oxide, arsenic oxide, tin oxide, titanium oxide, iron oxide, zinc sulfide, copper sulfide, lead selenide, lithium fluoride, silver chloride, sodium chloride, lead chloride, and lead fluoride. Most any solid inorganic material may be used and we may also use similar thin partially transparent layers of solid organic materials, and particularly of plastic materials such as the polymethacrylate resins. The commercial polymethacrylate plastics have a refractive index of approximately 1.49.

The thin partially transparent layers may be produced in several ways to secure the necessary uniformity and continuity of thickness in our semi-transparent reflective films and thereby secure uniformity of color and reflectivity characteristics throughout a mirror body and at the same time permit control of the forming of the desired thicknesses in such films. Deposition from a solution as a support is withdrawn from such solution at a constant rate is a well known method applicable to the organic materials generally and suitable for such other simple inorganic substances as are readily soluble. Where the mirror films are deposited chemically, the deposition reactions must be greatly retarded, as compared with former operations. Thus, the reaction mixtures and temperatures of deposition must be changed toward slowing down the entire deposition process so as to give more uniform and even development of crystal nuclei and even slower than normal rates of growth onto these nuclei. This deposition process is described more fully in our copending application directed to Method of Making Colored Mirrors, Serial No. 473,474, filed January 25, 1943 (now Patent No. 2,411,955), and in the following examples. We find the deposition of our very thin semi-transparent reflective films by thermal evaporation of the substance within a high vacuum to be a particularly attractive method. Our backing substantially opaque mirror films may be formed either by chemical deposition, by thermal evaporation, or by any other known means of producing an ordinary mirror film.

A discussion of the various figures illustrating some of the mirror structures that may be made under this invention will bring out the wide diversity of possible arrangements of the several films involved in such structures and indicate how the composites of partially transparent reflective films cooperate together and with the backing reflective mirror layer to give visually colored mirrors in which objects are clearly visible as images and in which the background cannot be viewed because of the opaqueness of the backing reflective mirror layer. It will be understood that in the figures like reference numbers indicate similar types of layers, or supports, and that the thicknesses as indicated by the drawings are solely for the purposes of illustration and that such thicknesses do not show the true proportions of the layers actually used in constructing our mirrors.

Figure 7:
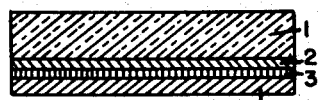
Figure 7 is a transverse vertical sectional view of a second surface mirror made according to one form of our invention.

The sectional view of Figure 7 illustrates a second surfaced mirror made according to our invention and which consists of the glass or other transparent support 1, the single continuous semi-transparent mirror film 2, the substantially opaque mirror backing 3, and the protective coating 4.

As some of our compound mirrors may be easily scratched or otherwise spoiled, we generally coat the back of the substantially opaque mirror backing with a protective layer of a paint, lacquer, or shellac, or we may copper-plate the backing or protect it with other means common to the mirror art. Such coatings do not take any part in the optical functioning of the mirror. We may also form our mirrors by disposing the semi-transparent film on the front surface of the support and the substantially opaque mirror film on the back surface of the support.

Figure 7A:
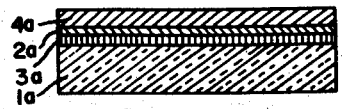
Figure 7a is a transverse sectional view illustrating a first surface mirror made according to one form of our invention.

In Figure 7a the sectional view illustrates a first surface mirror made according to our invention which consists of the glass or other support 1—a, the semi-transparent mirror film 2—a, the substantially opaque mirror film 3—a, and the thick protective transparent coating 4—a. The latter coating is thicker than 9 quarter wave length factors to prevent the same having any light interference effect. In Figure 9 there is represented a second surfaced mirror structure which differs essentially from that of Figure 7 in that the composite, partially transparent light reflective film element 5 is used instead of the single film element 2. This composite film element comprises the two partially transparent layers 6 and 7 which cooperate in producing interference coloration and in giving reflectivity.

Figure 9a illustrates a structure similar to that of Figure 9 but differing essentially in that the composite element 8 comprises the three partially transparent layers 9, 10 and 11 which cooperate in producing interference coloration and in giving reflectivity.

In Figure 10 there appears the first surface mirror structure comprising a support 1 which need not be transparent, the opaque mirror layer 3, and the partially transparent reflective layers 12 and 13 forming the composite element 14. This composite element cooperates with the opaque mirror backing to determine the color and reflectivity of the mirror structure. The mirror may be protected on its front face by a transparent lacquer film 15 which may also be colored, if desired, such film being generally of a character similar to coating 4—a as used in Figure 7a.

Figure 10a represents a complex mirror structure made in accordance with the invention in which the contacting thin partially transparent layers are upon the opposite side of the support from the opaque reflective backing and in which a further single partially transparent layer is in contact with the backing. Thus, upon the front side of the transparent support 1, the layers 16 and 17 are contacting thin laminae which cooperate in giving interference effects, and upon the back of the support the layer 18 is the single layer of suitable properties and thickness to cause interference effects, and backing this is the opaque mirror reflective backing 3. The film 4 is merely a protective paint or other coating and the film 15 is of the transparent protective type as discussed in connection with Figure 10.

The mirror of Figure 11 comprises the glass support 1, the three partially transparent layers 19, 20 and 21, and the three partially transparent layers 22, 23 and 24. The layers are backed by an opaque mirror backing 3, and this in turn may be protected if desired by a paint or other coating 4. The several layers 19, 20, 21 may each be of similar thickness or varied and of the same or different material. The same may be true for the layers 22, 23 and 24. In such a structure the large number of semi-transparent layers act cooperatively together to form the composite element 25, and this composite element and the opaque mirror backing determine cooperatively the color and reflectivity of the mirror so produced.

While our compound mirrors receive their colors from the thinness of the reflective film or films and the resultant light interference, and from the nature and reflective character of this film or films, and further from the reflective nature of the substantially opaque backing layer, it is apparent that we can further modify the color range and reflectivities of our mirrors, if we use instead of colorless glass, as the mirror support, a colored glass or other colored support body of transparent material. The color absorption characteristics of the support will limit the total reflectivity percentage possible and shift the general tones of color in the direction of the color of the glass or support material used. Similarly colored transparent layers thicker than $$\frac{9\lambda}{4N}$$

and without light interference effect may also be introduced into the structures in any suitable arrangement.

While the necessary thickness in a single partially transparent film or layer when used alone in our mirrors with the backing mirror reflective layer needs to approximate a quarter wave length factor of $$\frac{\lambda}{4N}$$

or some simple multiple of this, or where multiple reflection of R times is possible, some submultiple such as $$\frac{\lambda}{4NR}$$

to develop light interference colors, we find that, when employing a composite laminae of different substances to cooperatively produce light interference colors any one or more of these films may be of any extreme thinness, as long as they are continuous, but that any such film may not exceed a maximum thickness of $$\frac{9\lambda}{4N}$$

if it is to function in part in determining or giving light interference colored reflected light or mirror images. Thus we have employed individual films in our cooperating laminae of partially transparent reflective layers which have ranged as low in thickness as the .004 part of a $$\frac{\lambda}{4N}$$

factor and as high as $$\frac{3\lambda}{4N}$$

to $$\frac{5\lambda}{4N}$$

and we find films in the range of .01 to 2.5 times the quarter wave length factor $$\frac{\lambda}{4N}$$

in thickness to be particularly useful.

In the composite combinations of adjacent contacting partially transparent layers we may employ any combination of substances such as all the films being of metallic nature or of nonmetallic or of organic nature, such for example, as adjacent thin copper and silver layers backed by an opaque aluminum mirror or adjacent zinc sulfide and sodium fluoride layers; or these may be of mixed natures such as copper and magnesium fluoride or silica and copper. It will be apparent however that the order of arrangement of any given group of layers of different substances in the mirror with respect to the face of the mirror will result in mirrors of different color and reflectivity qualities as the layers are variously arranged with respect to each other.

Thus a second surface mirror having a film of copper of .030 micron and transmitting 20% of light when deposited on glass gave a composite mirror, when further coated with a transparent layer of .080 micron thickness of magnesium fluoride and a final coating of opaque reflective metallic silver, which was of red purple red color and of 52% overall reflectivity. When a similar thickness of magnesium fluoride was first deposited upon the glass and this was then coated with the same .030 micron of copper and the latter then coated with the opaque silver layer, a second surface mirror of a brighter and whiter tone was secured, the reflectivity being higher (56%) and the degree of interference coloration being less.

Consideration of the various possible reflections at the different interfaces and of the internal multiple reflections of light within a composite mirror structure, as diagrammatically shown by the light rays in Figure 8, shows that the light may follow many alternative courses to various degrees depending upon the total and selective light transmission character and action of the various films and the refractive indices of the adjacent layers and consequent reflective conditions at each of the interfaces, and as these rays are also influenced by the reflection character and conditions at the surface of the opaque reflector. Thus, in the mirrors just described the second surface mirror comprising the arrangement glass-copper-magnesium fluoride-opaque silver arranges these materials so that the refractive indices of the adjacent substances follow the sequence 1.56–(0.44 to 1.10)–1.38–0.17 while in the second mirror arrangement glass-magnesium fluoride-copper-opaque silver the sequence of refractive indices of the adjacent layers is 1.56–1.38–(.44 to 1.10)–0.17. It will be observed that the various differences in index of refraction of adjacent layers is generally lower for the second arrangement of the materials and consequently the relative reflection occurring at the various interfaces is less than in the first mirror construction and the interference action is less complicated and not as much light is apparently affected in such manner. While the adjacent layers may thus most effectively be arranged for maximum color developed by arranging the adjacent layers to show the most abrupt changes in index of refraction it is apparent that for the purposes of producing our mirrors most any arrangement will suffice and produce our desired color and reflectivity effects to some desired degree.

As previously indicated where the adjacent contacting partially transparent layers are of the same refractive index these layers cooperate in producing light interference in a manner just as a single film of the total thickness of such layers, neglecting differences arising from absorption effects. Where the adjacent contacting partially transparent layers are of different refractive index each film acts to retard the passage of a light wave through itself to a degree dependent upon its thickness and refractive index. Such retardations upon light rays such as a ray J in Figure 8 may act alone upon the rays directly reflected after passage through the top layer such as with ray L or multiply reflected ray N. Such rays can then cause interference with the ray K reflected directly from the top surface of the mirror. The retardations in the various contacting layers however are additive or cooperative in effect with each other after passage of the light into the subsequent layers as would be true for such rays as M or P or the other multiply reflected rays such as O, T, and Q. It is apparent that each ray would show various and different retardations and that each may show interference with the front surface reflected ray K or similar rays or with others of the various rays such as those illustrated. The relative strength of the separate rays varies with the reflective conditions at the various interfaces and the light absorption effects experienced in passage of the rays through the layers it travels through.

Thus the conditions of interference and reflection are extremely complex but the various films cooperate in securing the necessary retardation of some rays of light to get these out of phase with others and to thus cause the development of color by such light interference effects. As previously indicated, color is developed by the various possible combinations of thicknesses among the separate partially transparent reflective films, each such film apparently cooperating with the other such films in producing the light interference. Thus in Figure 14 there is shown a chart which is generally illustrative of the means of making our colored mirrors and of the variation in color as the respective films forming the composite element are varied in thickness. This diagram is typical for our various mirrors and shows that colored mirrors resulting from various thicknesses of the two films used for example, vary in color continuously as either film is changed in thickness and further it is apparent from the general hyperbolic nature of these curves that the two materials cooperate or replace each other giving a color effect dependent upon some cooperative or summation effect of the two films. The diagram specifically shows the colors of second surface mirrors in which various thickness thin transparent copper films are deposited upon the glass and coated in one series of mirrors with silica films and in the other series of mirrors with magnesium fluoride films. In each series the mirrors had an opaque silver mirror reflective backing. It is apparent that the silica and magnesium fluoride do not exert the same influence but that the effects by each are related in general to the relative refractive indices of each.

Figure 14:
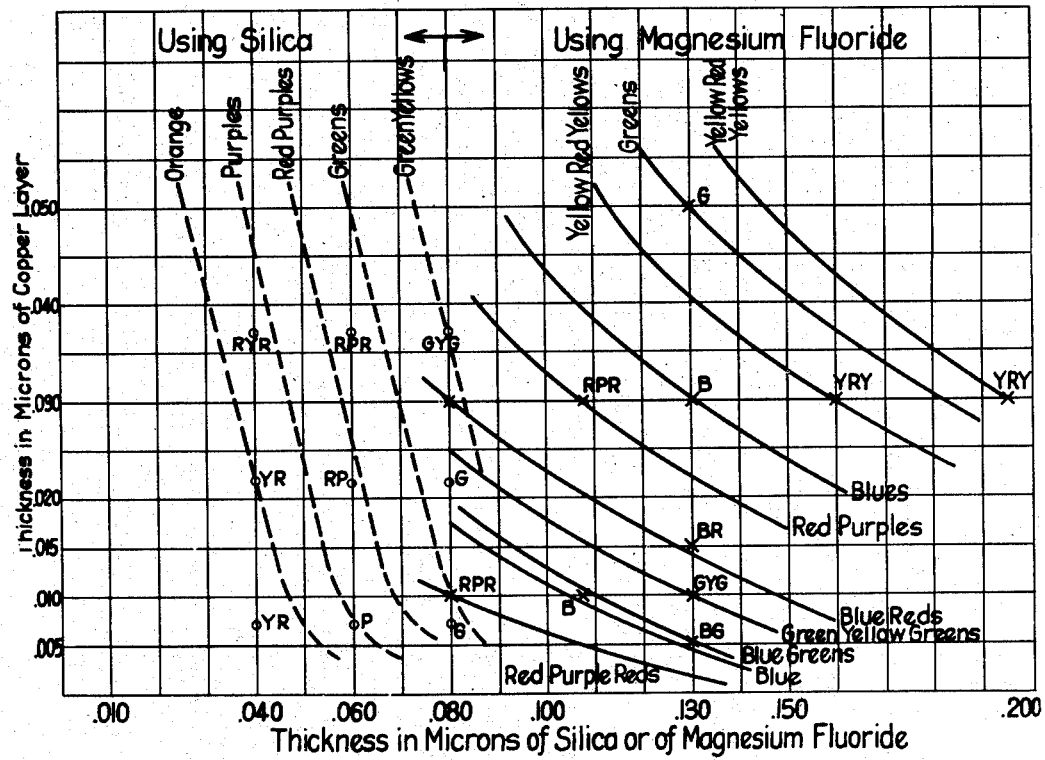
Figure 14 is a diagram illustrating the colors of our interference mirrors when these are prepared with an opaque silver reflective backing and cooperating layers of copper and silica or of copper and magnesium fluoride in various thicknesses.

In Figure 14 the mirrors, formed with the various thicknesses of partially transparent copper and silica layers as shown by the dotted lines or of copper and magnesium fluoride layers as shown by the full lines which fall upon one of the lines appearing in the diagram, are of the same color. This indicates that the widely varying sets of such films in varied thickness along such lines are cooperative together in general, each film acting to retard the passage of a light wave through itself to a degree dependent upon its thickness and its refractive index, and the total retardation being some summation of such individual effects. That the two silver backed mirrors as shown in Figure 14 made with .037 micron copper film and a silica film of .040 and otherwise with a .0074 copper film and a silica film of .060 micron thickness are both purples would seem to indicate that the relative changes in thickness of the two films had been compensating and that the light ray retardation effects in the two composite cooperating partially transparent laminae was much the same in view of the same general interference effect produced as indicated by the purple color in each case.

The purple color appearing in each case indicates clearly that the same wave lengths of light were altered by interference brought about by the retarded rays and that the spectral curve for each mirror would show a minimum at the same general wave length position. The spectral reflection curves would be expected to be generally similar for the two mirrors except as influenced by the selective absorption effects peculiar to the greater thickness of copper in the one case and the different relative reflection conditions at the different interfaces.

The curves of similar color as shown in Figure 14 are incomplete for all colors of the spectrum in each of the successive series but it is apparent that the spectral range was traversed at least once with the silver backed mirrors made with the transparent copper and silica films and that several spectral series followed each other in sequence with the mirrors made with the copper and magnesium films.

In view of the many complex paths as shown in Figure 8 in which the light rays may be directed within our multiple layered mirrors and of the considerable amount of and number of multiple internal reflections possible in the very thin highly or partially transparent layers it would appear that while the summation of the retardations of the light rays in the individual layers might be calculated by the well known vectorial method applied to such multiple layers it is apparent that due to the numerous multiple reflections occurring that the sums would not only indicate the cooperative films as acting similar to single films of $$\frac{\lambda}{4N}$$

thickness or some multiple of this as 3, 5, 7 but that interference color effects were secured in our mirrors at numerous thicknesses, such calculated totalized thicknesses as are submultiples of this such as $$\frac{\lambda}{4NR}$$

and multiples of these figures by odd integers 1, 3, 5, 7 and so forth. In the examples which follow many cases appear where R appears to be of value 2, 4 and 8. However, as the phenomena in the mirrors as made under this invention are highly complex and further complicated by absorption effects we do not feel that such values as may so be calculated are limiting. As shown in Figure 14, any combinations of films, each sufficiently thin, will when reflective mirror backed give us colored mirrors according to this invention.

The mirrors produced in the manner of this invention and in the examples which follow will have a desired color and reflectivity value and the color indicated in each example will be the color of the mirror when viewing it directly at perpendicular or normal incidence. When viewing the mirror at different angles, the shade of the color will vary.

The nature of our new mirrors and their means of formation will be apparent from the following examples.

EXAMPLES 1 AND 2

In these examples a single thin semi-transparent reflective film of lead sulfide is deposited by special chemical means, this film being of different thickness in each example and, in turn, in each case being backed with a relatively opaque silver mirror layer. Each of the mirrors is of different color and spectral and total light reflective characteristics as shown in the respective spectral reflection curves given in Figures 12 and 13. For comparison the spectral reflection characteristics of a simple semi-transparent reflective lead sulfide mirror film alone of the same thickness is given in each figure so that it can be compared to the combination of such a mirror film with the backing layer of substantially opaque silver to demonstrate clearly the effects arising from the combination as compared to the semi-transparent layer alone.

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows: Solution A, which contains 3.18% of sodium hydroxide and 0.00054% of sodium potassium tartrate. Solution B, which contains 3.7% of lead acetate and 0.264% of acetic acid. Solution C, which contains 2.64 of thiourea. These three solutions are mixed together in equal quantities just prior to their being poured onto the glass. The mixed solution at the time of pouring is of the following composition:

1.06% sodium hydroxide
1.23% lead acetate
0.88% thiourea
0.088% acetic acid
0.00018% sodium potassium tartrate As compared with the method of forming lead sulfide mirrors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a temperature of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction. While the deposition rate of the formula of Patent 1,662,564 can be decelerated by working even below 68 degrees Fahrenheit or by using less alkali, neither of these procedures will give satisfactory uniformity for the making of good interference colored mirrors. The use of the small amount of sodium potassium tartrate is thus very desirable, although we have found that other materials may be used as retarders, as indicated in our said copending application.

In order to overcome the limiting of the amount of solution in contact with the glass at its edge by surface tension effects and the variation in deposit thickness at the edges, as a consequence, we find it peferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely opaque ordinary type lead sulfide mirror is secured, in which the thickness of coating is about 0.140 micron. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following Table I, the semi-transparent upper reflective deposits of lead sulfide numbered 2a and 4a were made. The various colors and spectral reflectivity exhibited by these mirror films, as well as their semi-transparent nature, is shown by the data in this table. Diluting the chemical solution with a large amount of water stopped the deposition reaction at the times indicated. The mirrors were then flushed with considerable water and the surface thoroughly cleaned by gently rubbing with wet cotton.

Table I

| Mirror Number | Time of Forming, Minutes | Color | Total Percent Reflectivity | Total Percent Transmission | Spectral Minimum | Film Thickness, Microns | Wave Factors | No. of Times Ray Reflected |
|---|---|---|---|---|---|---|---|---|
| 2a | 13.3 | Pale Yellow | 35.7 | 42 | 4000 | .026 | $\frac{\lambda}{4N}$ | 1 |
| 4a | 15.2 | Orange Yellow | 31.7 | 37 | 4700 | .030 | $\frac{\lambda}{4N}$ | 1 |

The mirrors were then flushed with considerable water and the surface thoroughly cleaned by gently rubbing with wet cotton. The wet glasses were then placed on a regular silvering table with the lead sulfide surface up and a silver mirror deposit was formed directly on top of the lead sulfide layer, using any of the regular chemical silvering formulae. For example, we may pour onto the glass, at about 70 degrees Fahrenheit, a freshly mixed solution of 1.2% silver nitrate, 1.2% sodium hydroxide, 3.75% of concentrated ammonia water, and 0.20% invert sugar, all dissolved in water. After about ten minutes, the solution may be rinsed off and the silver back formed may be rinsed thoroughly and dried, after which a protective coating of shellac may be applied on top of the silver. The semi-transparent lead sulfide coatings 2a and 4a were thus used, respectively, in forming the compound mirrors 3 and 6, given in Table II which follows.

In Table II, each of the mirrors is a compound colored mirror made with a single thin semi-transparent lead sulfide reflecting film of increasing thickness, going from Example 1, mirror 3, through Example 2, mirror 6, which film causes light interference effects, and an opaque silver mirror backing layer. This table shows the color of the mirrors, thus produced, and their total reflectivity value. Each of the mirrors was perfectly uniform in color and a good reflector. Comparison of the Examples 1 and 2 with the simple semi-transparent mirror films shown in Table I as samples 2a and 4a, which were used in making Examples 1 and 2, showed that by the use of the backing reflector, the colors were made deeper and the mirrors were mostly brighter, or as the two tables show the total percentage reflectivity was increased.

Table II

| Example No. | Mirror No. | Color | Total Percent Reflectivity | Spectral Minimum | Lead Sulfide Film Thickness, Microns | Wave Factors | No. of Times Reflected |
|---|---|---|---|---|---|---|---|
| 1 | 3 | Blue Yellow | 36.6 | 4,000 | .026 | $\frac{\lambda}{4N}$ | 1 |
| 2 | 6 | Orange | 35.2 | 4,800 | .030 | $\frac{\lambda}{4N}$ | 1 |

Figure 12:
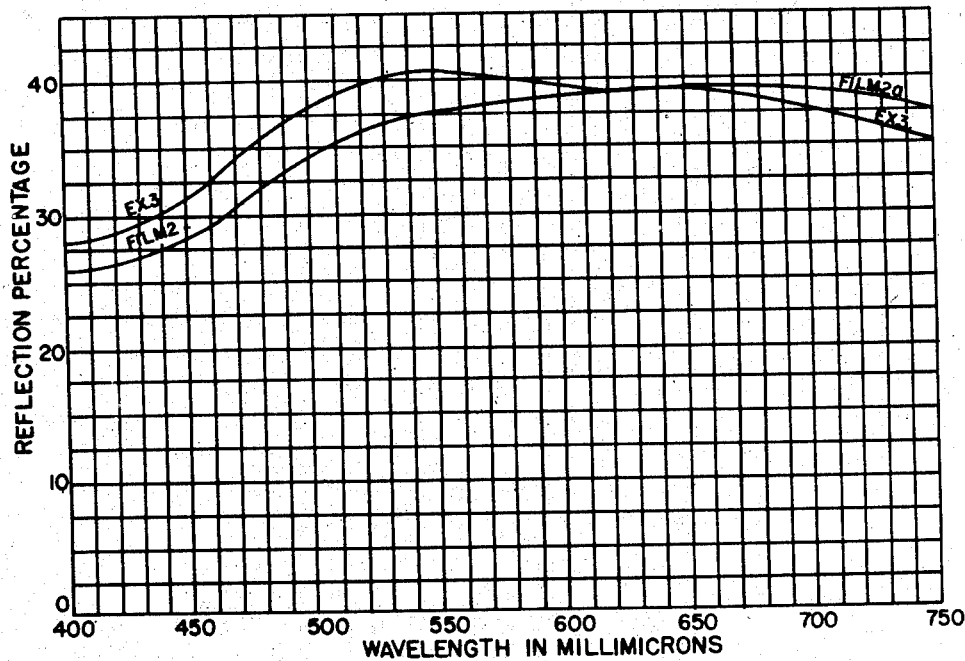
Figure 12 is a diagram illustrating for comparison a spectral reflection curve of a simple semi-transparent film of lead sulfide and a spectral reflection curve of our compound mirror made by using a semi-transparent film of lead sulfide of comparable thickness plus an opaque backing-up film of silver.
Figure 13:
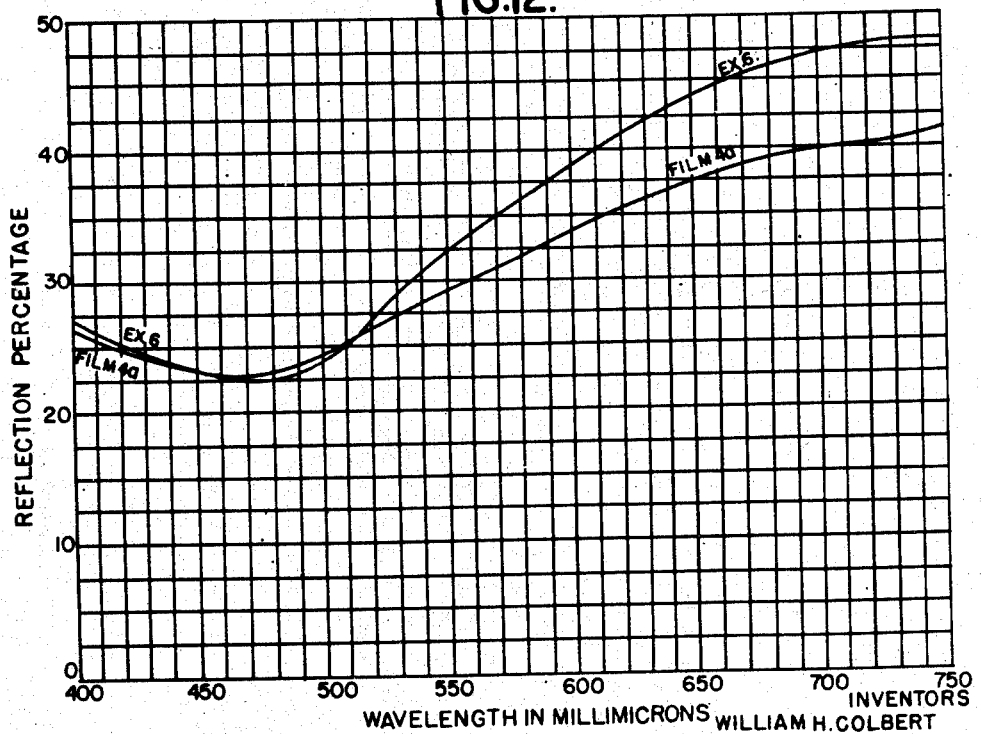
Figure 13 is a similar view comparing the effects produced by a simple semi-transparent lead sulfide film of a different thickness than that of Figure 12 with the combination of a similar thickness of such film and an opaque silver film.

The spectral reflectivity curves Figures 12 and 13 respectively for these compound mirrors each shows a dip in the curve or minima. By comparison, the spectral reflectivity curve for an ordinary opaque film lead sulfide mirror, as shown in Figure 1, is free of any dip or indication of color. The minima in the spectral reflectivity curves shows the light rays which are being diminished in the reflected light by interference. As would be expected for interference effects, the minima continually shift in the examples toward the longer red rays, as the film thickness of the semi-transparent lead sulfide layer, in the examples, is increased. The wave length at which the minima appear in the spectral reflection curves for the various samples, in both Tables I and II, are shown as well as the thickness of the lead sulfide layer.

In Examples 1 and 2, the semi-transparent lead sulfide reflective layer thickness, at which the interference minima occur with the different light waves, is related to the wave length by the ratio of $$\frac{\lambda}{4N}$$

The apparent color of these mirrors is obviously largely dependent upon the color of the light removed by interference.

In order to more clearly bring out the nature of the color and reflective characteristics of our new compound mirrors and how the backing layer of an opaque mirror, such as silver, plays a part in determining these characteristics, the spectral reflectivity curves in Figures 12 and 13 are given. In each figure, the reflectivity curve for one of our new compound mirrors is given and compared with the spectral reflectivity curve for an equally thick semi-transparent lead sulfide reflective film which has not been backed up with silver. Thus, in Figure 12 the film 2a of Table I is compared with our Example 1. Each curve shows the dip in its curve at the same place as caused by interference. The silver-backed example has, however, a higher reflection in the green and a higher total reflection. In Figure 13, the film 4a is compared with Example 2 and a much higher reflectivity in the yellow, orange and red is to be noted with the silver-backed mirror and the total reflectivity is 35.2%, as compared with 31.7%.

It is quite obvious from the curves of Figures 12 and 13 that the films of lead sulfide are not only quite transparent in the thicknesses used in our mirrors, as shown in Table I, but that this particular material in these thicknesses is proportionally more transparent in the reds and, as a result, backing up these films with a material reflecting in the red, such as silver, brings about considerable changes in the red reflectivity, increasing this in some cases and very definitely decreasing this when the lead sulfide layer is of the right thickness to cause interference losses in the red.

The mirrors of Examples 1 and 2 may be used in furniture, in store decoration, and in a wide variety of decorative and reflector uses.

EXAMPLE 3

If in preparing the semi-transparent lead sulfide reflective coating for Example 1, we arrange to blow a fine gentle current of air on the top of the glass plate, while it is in the pan being coated with the lead sulfide, and do so at several points, the resulting mirror produced when backed with a coating of silver will not be of one uniform color throughout but will show a variegated pattern in various colors. This is due to the fact that the film thickness of the deposited lead sulfide at various points on the glass will vary and the effects of the backing layer of silver will also vary at the different spots. Such a coating may obviously be employed as one of the layers in the composite film means such as the lead sulphide layer disclosed herein.

EXAMPLES 4 TO 14

Cleaned pieces of glass were mounted within a chamber and, in the high vacuum created therein, there was deposited by thermal evaporation upon the glass a thin layer of copper of a thickness in each specific example as shown in Table III. Upon this continuous thin layer, which showed the transparency as indicated in the table, there was next deposited by thermal evaporation a layer of magnesium fluoride of the respective thicknesses indicated and thereafter in each case the mirror was completed by further depositing on the magnesium fluoride an opaque reflective backing of silver. Silver has a refractive index of 0.17.

Each of the second surface mirrors thus employs a composite film element of copper and magnesium fluoride and a backing of opaque silver and in each case the mirror produced showed a visually effective color and clear reflected images of high brilliancy. The colors and total reflectivity of each of the mirrors is given in the Table III, the colors being expressed according to the Munsell color system in these ex-

*Table III*

| Example No. | Percent Transmission of Copper Layer | Percent Total Reflectivity of Copper Layer | Thickness in Microns | | Thickness in $\frac{\lambda}{4N}$ | | Properties of Completed Mirror | | |
|---|---|---|---|---|---|---|---|---|---|
| | | | Copper Layer | MgF$_2$* Layer | Copper Layer | MgF$_2$* Layer | Spectral Minima | Color | Total Reflectivity |
| 4 | 22 | 27 | .030 | .080 | .21 | .84 | 5,250 | RPR | 46 |
| 5 | 22 | 27 | .030 | .107 | .17 | 1.07 | 5,250–5,500 | RPR | 39 |
| 6 | 22 | 27 | .030 | .130 | .10 | 1.04 | 6,850 | B | 35 |
| 7 | 22 | 27 | .030 | .159 | .25 | 1.86 | 4,700 | YRY | 60 |
| 8 | 22 | 27 | .030 | .195 | .25 | 2.28 | 4,700 | YRY | 60 |
| 9 | 57 | 9 | .010 | .080 | .07 | .84 | 5,250 | RPR | 33 |
| 10 | 57 | 9 | .010 | .107 | .035 | .86 | 6,850 | B | 43 |
| 11 | 57 | 9 | .010 | .130 | .08 | 1.50 | 4,000–4,200 | GYG | 68 |
| 12 | 74 | 5 | .005 | .130 | .018 | 1.00 | 7,200 | BG | |
| 13 | 45 | 13 | .015 | .130 | .088 | 1.30 | 5,500 | BR | |
| 14 | 7.8 | 42 | .050 | .130 | .176 | .98 | 7,300 | G | |

*MgF$_2$ is Magnesium Fluoride in all references.
Y is Yellow.
G is Green.
B is Blue.
P is Purple.
R is Red.

amples and generally in the further examples of this invention. The calculated thicknesses of the separate partially transparent layers in terms between the thicknesses of the partially transparent layers employed in Examples 4 to 23 and the color of the same mirrors.

Table IV

| Example No. | Percent Transmission of Copper Layer | Percent Total Reflectivity of Copper Layer | Thickness in Microns | | Thickness in $\frac{\lambda}{4N}$ | | Properties of Completed Mirrors | | |
|---|---|---|---|---|---|---|---|---|---|
| | | | Copper Layer | Silica Layer | Copper Layer | Silica Layer | Spectral Minima | Color | Total Reflectivity |
| 15 | 66 | 7 | .0074 | .040 | .066 | .47 | 4,950 | YR | 46 |
| 16 | 66 | 7 | .0074 | .060 | .045 | .625 | 5,600 | P | 43 |
| 17 | 66 | 7 | .0074 | .080 | .073 | .98 | 4,800 | G | 60 |
| 18 | 32 | 19 | .022 | .040 | .195 | .47 | 4,950 | YR | 51 |
| 19 | 32 | 19 | .022 | .060 | .168 | .66 | 5,250 | RP | 33 |
| 20 | 32 | 19 | .022 | .080 | .022 | .98 | 4,800 | G | 61 |
| 21 | 15 | 34 | .037 | .040 | .355 | .48 | 4,850 | RYR | 58 |
| 22 | 15 | 34 | .037 | .060 | .280 | .66 | 5,250 | RPR | 44 |
| 23 | 15 | 34 | .037 | .080 | .50 | 1.11 | 4,200 | GYG | 59 | of fractional quarter wave lengths are also given in the table as calculated by using the refractive index of the individual layer for the wave length which is shown in the table as the approximate location of the minima in the spectral reflection curve for each compound mirror.

Figure 16 shows the full spectral reflection curve at 16C in the visible light range for the mirror produced as Example 4.

EXAMPLES 15 TO 23

As in the preceding examples, a thin, continuous, uniform layer of copper was deposited upon clean glass plates in a vacuum by thermal evaporation. Thereafter within a vacuum a thin transparent continuous uniform layer of silica was deposited upon the copper and subsequently also by thermal evaporation an opaque mirror reflective backing of silver was applied on top of the silica. The thicknesses of the thin partially transparent layers comprising the composite film element are shown in Table IV in microns and in fractional quarter wave length factors as calculated from the approximate minima in the spectral reflection curve of the completed second surface mirrors. The visually apparent color of the mirrors is shown in the table as is also the total reflectivity of the mirrors. For comparison the light transmission and reflectivity of the copper films alone before any of the other layers or backing were applied is shown and it is apparent that these figures are not simply related to the characteristics of the final mirrors.

In Figure 16 at 17C there appears the spectral reflection curve of the mirror produced as Example 19. The mirrors reflect light specularly and form excellent colored images. In Figure 14 there appears a curve giving the general relations

EXAMPLES 24 TO 27

In Table V there appears the thicknesses of transparent layers of silver thermally deposited on glass in a vacuum and subsequently applied thicknesses of thermally evaporated magnesium fluoride which together formed a composite element in compound mirrors which had a further mirror backing of opaque mirror reflective silver also applied by thermal evaporation. The visual color of these mirrors and the location of the spectral minima, indicating the colored light removed by light interference is shown. The mirrors were highly reflective, as indicated, and gave good clear images. Figure 16 gives the spectral reflection curve 18C for the mirror of Example 27 shown in the table.

Table V

| Example No. | Percent Transmission of Silver Layer | Percent Total Reflectivity of Silver Layer | Thickness in Microns | | Thickness in $\frac{\lambda}{4N}$ | | Properties of Completed Mirror | | |
|---|---|---|---|---|---|---|---|---|---|
| | | | Silver Layer | MgF$_2$ Layer | Silver Layer | MgF$_2$ Layer | Spectral Minima | Color | Total Reflectivity |
| 24 | 76 | 8 | .0037 | .130 | .006 | 1.80 | 4,000 | YGY | 82 |
| 25 | 61 | 18 | .0074 | .130 | .013 | 1.80 | 4,000 | YGY | 85 |
| 26 | 49 | 32 | .0111 | .130 | .018 | 1.70 | 4,200 | GYG | 81 |
| 27 | 39 | 44 | .0148 | .130 | .004 | 1.11 | 6,500 | GBG | 77 |

EXAMPLES 28 TO 31

These compound mirrors were also made by thermal deposition of the various layers and of the backing opaque silver layer used. Aluminum in the transparent thicknesses shown in Table VI was first deposited on the glass and then the given thicknesses of silica were deposited upon this, the opaque silver backing then being applied to the silica. As the table shows, these mirrors were of good image forming reflectivity and were colored. The individual partially transparent layers of aluminum and of silica were all of less than $$\frac{\lambda}{4N}$$

thickness and as a composite element they acted with the opaque mirror reflective backing to give color by light interference effects, as shown by the indicated spectral minima and more particularly in Figure 16 at 19C giving the spectral reflection curve for Example 30.

duced and the mirrors are useful in furniture and other articles of commerce.

Table VI

| Example No. | Percent Transmission of Aluminum Layer | Percent Total Reflectivity of Aluminum Layer | Thickness in Microns | | Thickness in $\frac{\lambda}{4N}$ | | Properties of Completed Mirror | | |
|---|---|---|---|---|---|---|---|---|---|
| | | | Aluminum Layer | Silica Layer | Aluminum Layer | Silica Layer | Spectral Minima | Color | Total Reflectivity |
| 28 | | | .0038 | .082 | .050 | 1.14 | 4,200 | GYG | 64 |
| 29 | | | .0070 | .082 | .084 | 1.00 | 4,800 | G | 47 |
| 30 | | | .0112 | .082 | .106 | .79 | 6,100 | B-BGB | 38 |
| 31 | | | .0139 | .082 | 1.66 | 1.00 | 4,800 | G | 64 |

EXAMPLES 32 TO 35

By thermally depositing chromium in thin partially transparent layers of various thicknesses and then similarly depositing films of magnesium fluoride of 0.130 micron thickness upon the chromium and subsequently depositing an opaque silver reflective backing on the magnesium fluoride there was produced the colored mirrors of good reflectivity shown in Table VII. The colors result from interference of the rays corresponding to the spectral minima shown and are more apparent in Figure 16 at 20C which shows the spectral reflection curve for mirror Example 33.

Table VIII

| Example No. | Opaque Backing | Color of the Mirror | Total Reflectivity of the Mirror | Spectral Curve Figure No. |
|---|---|---|---|---|
| 36 | Silver | YR-RYR | 52 | 29 |
| 37 | Copper | R | 47 | 30 |
| 38 | Aluminum | YR-RYR | 55 | 31 |
| 39 | Gold | R | 47 | 32 |

EXAMPLES 40 TO 43

A series of four different mirrors were prepared as in the preceding Examples 36 to 39 in which,

Table VII

| Example No. | Percent Transmission of Chromium Layer | Percent Total Reflectivity of Chromium Layer | Thickness in Microns | | Thickness of $\frac{\lambda}{4N}$ | | Properties of Completed Mirrors | | |
|---|---|---|---|---|---|---|---|---|---|
| | | | Chromium Layer | MgF$_2$ Layer | Chromium Layer | MgF$_2$ Layer | Spectral Minima | Color | Total Reflectivity |
| 32 | 76 | 7 | .0062 | .130 | | | 4,000 | YGY | 78 |
| 33 | 62 | 13 | .0124 | .130 | | | 4,700 | YRY | 69 |
| 34 | 50 | 20 | .0186 | .130 | | | 5,250 | RP | 37 |
| 35 | 41 | 25 | .0248 | .130 | | | 5,600 | P | 18 |

EXAMPLES 36 TO 39

In these examples a layer of copper which was .030 micron thick and which was partially transparent as it transmitted 20% and reflected 27% light from the second surface of a purplish shade was deposited upon a shaped piece of glass by thermal evaporation. Upon this was deposited a transparent layer of magnesium fluoride by thermal evaporation which was .070 micron thick. Four such pieces were prepared and upon the back of the magnesium fluoride there was deposited an opaque mirror reflective backing of silver, copper, aluminum and gold in the separate cases, as shown in Table VIII. The four mirrors thus provided, as shown in the table, were of different colors and reflectivities as is more particularly evident from the spectral curves for the respective mirrors as shown at 29C, 30C, 31C and 32C in Figure 18. Silver and aluminum backings do not give the same result and clearly the selective reflection qualities of the copper and gold backings lead to quite strikingly different colored mirrors. Thus, the cooperative action of the opaque mirror backing with the same partially transparent cooperative composite element is quite specific and by such specific action clearly shows that the backings do modify the color and reflectivities secured in our mirrors. In each case, good images were produced however, the .070 micron thick layer of magnesium fluoride was first deposited upon the glass. Then the .030 micron thick layer of copper was deposited upon this and thereafter backing layers of silver, copper, aluminum and gold were applied. The four mirrors produced were quite different in color and total reflectivity from the mirrors of Examples 36 to 39 which employed the same films and backings but in a different arrangement. Thus, the mirror with a silver backing had a total reflectivity of 56% and a spectral reflectivity curve as shown at 33C in Figure 18, the copper backed mirror a reflectivity of 56% and a spectral curve as shown at 34C; the aluminum backed mirror a reflectivity of 62% and a spectral curve as shown at 35C; and the gold backed mirror a reflectivity of 55% and a spectral curve as shown at 36C. The four second surface mirrors were of yellow red to yellow red yellow visual colors and they have good specular reflected images.

EXAMPLES 44 TO 47

Four pieces of glass cut to the size of automobile rear view mirrors were cleaned and coated by thermal evaporation in a vacuum with a layer of .0155 micron thickness of aluminum. The light transmission was 50% and the reflectivity was only 8%. No apparent color was present. On top of this film in each case there was deposited a .082 micron thick layer of silica as a transparent layer. Four mirrors were then completed by backing the separate coated glasses with opaque layers of silver, copper, aluminum and gold. In Table IX these four mirrors appear and at 21C, 23C, 22C and 24C there are shown the respective spectral reflection curves for visible light for the four mirrors with silver, copper, aluminum or gold backings. The mirrors are useful as rear view automobile mirrors giving clear sharp images.

*Table IX*

| Example No. | Opaque Backing | Color of the Mirror | Total Reflectivity of the Mirror | Spectral Curve Figure No. |
|---|---|---|---|---|
| 44 | Silver | Y | 73 | 21 |
| 45 | Copper | YRY | 50 | 23 |
| 46 | Aluminum | Y-GY | 66 | 22 |
| 47 | Gold | Y-YRY | 47 | 24 |

EXAMPLES 48 TO 51

A set of four mirrors using the same partially transparent layers of the same thickness as in Examples 44 to 47 and employing the same opaque mirror reflective backings was prepared but differing only in that the silica layer was in contact with the glass support and the transparent aluminum layer was on top of this and in contact with the backing reflective opaque layers of silver, copper, aluminum and gold. The mirrors had the properties shown in Table X and are quite different from the mirrors in Table IX. The respective Examples 48 to 51, as shown in Table X gave spectral reflection curves as shown at 25C, 26C, 27C and 28C and from such curves it is apparent that bright images in visual colors are given by these products.

*Table X*

| Example No. | Opaque Backing | Color of the Mirror | Total Reflectivity of the Mirror | Spectral Curve Figure No. |
|---|---|---|---|---|
| 48 | Silver | Y | 45 | 25 |
| 49 | Copper | YR | 45 | 26 |
| 50 | Aluminum | Y | 58 | 27 |
| 51 | Gold | YRY | 36 | 28 |

The above last eight second surface mirrors (Examples 44 to 51) could be also prepared upon other transparent supports such as polished sheets of polymethacrylate resin or upon polished sheets of a polymerized allyl acylate resin.

EXAMPLE 52

A cleaned piece of transparent glass was coated on one side by chemically depositing lead sulfide as in Example 2. The partially transparent coated glass was then introduced into a high vacuum and a thin transparent layer of silica was evaporated on top of the lead sulfide. The coated piece was then turned around and an opaque layer of aluminum was then evaporated upon the uncoated surface thus exposed. This gave a colored mirror giving clear reflected images in which the composite element of the plurality of partially transparent layers was on the front side of the mirror support and the opaque reflective backing was on the back side of the mirror support.

EXAMPLE 53

First surface mirrors were made by thermally evaporating upon the top surface of a clear or opaque glass support successively an opaque silver backing layer, a thin partially transparent layer of zinc sulfide and finally a thin partially transparent layer of silica. Various visual colored reflections of different total percentage were found in the mirrors as the mirrors were prepared with different thicknesses of the two transparent upper layers. A combination of a zinc sulfide film of .040 micron thickness and of a silica layer of .060 micron thickness with the opaque silver backing gave a beautiful colored mirror. This combination of films was used in preparing articles showing colored reflective surfaces by applying the successive coatings in the order given upon a flat plastic Bakelite button and upon a glass tumbler having smooth vertical side walls. In the forming of the deposits upon the tumber the tumbler was rotated continuously during the deposition by thermal evaporation of the various layers and coatings.

EXAMPLES 54 AND 55

As examples of colored mirrors made by light interference effects using a composite laminae comprising only metals as the component elements, there was first deposited on two pieces of glass by thermal evaporation in a vacuum, a thin transparent continuous layer of copper of .011 micron thickness, and next a thin transparent continuous layer of aluminum of .010 micron thickness. One of these mirrors was finally backed by a substantially opaque mirror-reflective layer of silver also deposited by thermal evaporation in a vacuum. The completed mirror had a total reflectivity of 38%. The other was backed by a substantially opaque mirror-reflective layer of copper. The copper layer was also deposited by thermal evaporation. The mirror thus produced had a total reflectivity of 56%. Both mirrors showed distinct colored images. The silver backed mirror was yellow red yellow in color, and the copper backed mirror, yellow red.

EXAMPLES 56 AND 57

Two mirrors were made in exactly the same manner as the two in the preceding examples and using the same thickness layers but differing from the mirrors in the preceding examples in that the thin continuous light interference component elements of the composite laminae were deposited in reverse order, that is, the aluminum film first and then the copper. This gave mirrors which were of the same general color tones as those in the preceding examples, but of lower total reflectivity. The silver backed mirror in this case had a total reflectivity of 45% and was yellow to yellow red yellow in color. The copper backed mirror had a total reflectivity of 41% and was yellow red in color. These mirrors likewise formed excellent colored images.

EXAMPLES 58 TO 63

Table XI shows the colored mirrors produced by using a complex composite of partially transparent laminae cooperatively acting to produce light interference effects backed up by a mirror reflective backing of silver in some instances, and of copper in other instances. In producing these mirrors, there was first deposited on two pieces of glass by thermal evaporation in a vacuum a continuous uniform film of copper of .0054 micron thickness and next, in a similar manner, a continuous uniform film of silica .037 micron thick. On two other pieces of glass this deposition cycle of .0054 micron thick copper and .037 micron thick silica was repeated twice. On still two other pieces of glass the cycle was repeated three times. One each of the single, double and triple dual deposits of copper and silica was backed with substantially opaque reflective silver and one each with substantially opaque reflective copper. As shown in the table, all these mirrors are colored, of different reflectivities and gave distinct mirror images. Differences in color are clearly shown by the spectral reflection curves shown at 37C, 38C and 39C, respectively, for the mirrors comprising silver mirror backed single, double and triple dual deposits of copper and silica, and at 40C, 41C and 42C, respectively, for mirrors comprising copper mirror backed single, double and triple dual deposits of copper and silica.

Table XI

| Example No. | Opaque Backing | Color of the Mirror | Total Reflectivity of the Mirror | Spectral Curve Figure No. |
|---|---|---|---|---|
| 58 | Silver | PB | 30 | 37 |
| 59 | do | GY | 34 | 38 |
| 60 | do | P | 11 | 39 |
| 61 | Copper | R | 22 | 40 |
| 62 | do | Y | 28 | 41 |
| 63 | do | P | 8.5 | 42 |

In our colored mirrors the total thickness of the composite element comprising the contacting partially transparent interference layers with the adjacent layers having continuously contacting interfaces can be greater than $$\frac{9\lambda}{4N}$$

but it is necessary that each separate layer be not greater than $$\frac{9\lambda}{4N}$$

Also our mirrors have a reflectivity greater than that of the support and preferably greater than 10% in visible light.

It will be apparent from the above description that we have provided colored mirrors or other mirror reflective articles of a wide range of color characteristics and of a wide range of reflectivity percentage characteristics which can be controlled as desired. The color values in the reflective mirror films are secured primarily by the light interference effects but are modified by the selective light transmission and absorption and the reflective character of our semi-transparent layers and further modified by the specular reflective nature of the substantially opaque backing reflective layer. As the colors are thus produced by physical effects, they are permanent and non-fading and the colored mirrors produced are inexpensive.

Various other advantages will be apparent from the preceding description and the following claims.

What we claim is:

1. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and N represents the refractive index of said layer, and substantially opaque specular light reflective means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

2. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness between .004 and nine times the quarter wave length factor $$\frac{\lambda}{4N}$$

inclusive where $\lambda$ represents a wave length of visible light and N represents the refractive index of said layer, and substantially opaque specular light reflective means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

3. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness between .01 and 2.5 times the quarter wave length factor $$\frac{\lambda}{4N}$$

inclusive where $\lambda$ represents a wave length of visible light and N represents the refractive index of said layer, and substantially opaque specular light reflective means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

4. An article as defined in claim 1 in which said layers are of uniform thickness.

5. An article as defined in claim 1 in which at least one of said layers has portions of different thickness.

6. An article as defined in claim 1 in which the article is a second surface mirror, said support means is transparent and in which said film means is on the back surface of said support means and said reflective means is on the back surface of said film means.

7. An article as defined in claim 1 in which the article is a first surface mirror, said reflective means is on the front face of said support means and said film means is on the front face of said reflective means.

8. An article as defined in claim 1 in which said reflective means is effective to absorb at least one color transmitted by said film means.

9. An article as defined in claim 1 in which said layers are formed of inorganic material.

10. An article as defined in claim 1 in which said reflective means is an inorganic compound.

11. An article as defined in claim 1 in which said reflective means is metal.

12. A colored article having mirror specular light reflective surface portions having an effective reflectivity to produce an adequate clear reflected image and exhibiting different visually effective color effects as a result of light ray interference, comprising support means in the form of a shaped body having a surface formed with portions angularly disposed with respect to each other, composite, partially transparent, continuous light interference reflective color producing film means, inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and N represents the refractive index of said layer, and substantially opaque specular light reflective means behind said film means, all of said means being superimposed in fixed relation to each other with adjacent means having their interfaces in intimate optical contact, one of said substantially opaque and film means being on a surface portion of said shaped body, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article, said composite film means covering at least one of said portions, which covered portions are sufficiently smooth to produce specular reflection, the angularly disposed portions of the surface of said article being so disposed with respect to a single point of observation that light rays incident upon said body and reflected at the rear surface of said film means to said single point of observation are caused to traverse said film means along paths of different lengths to produce different visually effective colors at different areas of said body by light interference with light reflected from the film means forwardly of the rear surface thereof, which colors vary substantially in accordance with changes in angularity of said areas with respect to said single point of observation.

13. An article as defined in claim 12 in which the article is a glass tumbler having inner and outer surfaces, and the film means is applied to one of the outer surfaces of the tumbler.

14. An article as defined in claim 12 in which the article is a glass tumbler and the film means and opaque means are applied to the outer surface of said glass.

15. An article as defined in claim 12 in which the article is a button and the film means is applied to the surface thereof.

16. A colored article having a mirror specular light reflective surface having an effective reflectivity to produce an adequate clear reflected image and also producing visually effective color, comprising a composite, partially transparent, continuous light interference reflective color producing film inherently producing color by interference between light rays reflected forwardly from said film, said film comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and N represents the refractive index of said layer, and a substantially opaque specular reflecting metal member behind said film, said film being superimposed in fixed relation on the front specularly reflecting surface of said substantially opaque specular reflecting metal member, the adjacent surfaces of said film and member being in intimate optical contact, the refractive index of said member being sufficiently different from that of the adjacent layer of said film to bring about reflection of light back through said film, the thickness of said film layers and the differences in the refractive indices thereof being so correlated that part of certain of the spectral waves of the visible spectrum is removed by light interference from the light reflected from the colored article to thereby produce an article having the desired color effect.

WILLIAM H. COLBERT.
WILLARD L. MORGAN.

REFERENCES CITED

The following references are of record in the file of this patent:

UNITED STATES PATENTS

| Number | Name | Date |
|---|---|---|
| 2,392,978 | Dimmick | Jan. 15, 1946 |
| 2,403,685 | Sachtleben et al. | July 9, 1946 |

OTHER REFERENCES

Edwards: "Interference in Thin Metallic Films," Physical Review, July 1, 1931 (vol. 38), pages 166–173.

Physical Optics, Text, R. W. Wood, 1936; published by the MacMillan Co., New York; pages 198 and 199.

Cartwright et al.: Publication, "Multi-Layer Films of High Reflecting Power," American Physical Society, volume 14, No. 2, April 1939, page 24.